(12) United States Patent
Maeda et al.

(10) Patent No.: US 8,044,132 B2
(45) Date of Patent: Oct. 25, 2011

(54) FLUORINE-CONTAINING ELASTOMER COMPOSITION

(75) Inventors: Mitsuru Maeda, Ibaraki (JP); Yasunori Yanai, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 134 days.

(21) Appl. No.: 12/311,573

(22) PCT Filed: Sep. 25, 2007

(86) PCT No.: PCT/JP2007/068561
§ 371 (c)(1),
(2), (4) Date: Apr. 3, 2009

(87) PCT Pub. No.: WO2008/041557
PCT Pub. Date: Apr. 10, 2008

(65) Prior Publication Data
US 2010/0029831 A1    Feb. 4, 2010

(30) Foreign Application Priority Data
Oct. 3, 2006  (JP) .................................. 2006-271527

(51) Int. Cl.
*C08K 3/36* (2006.01)
*C08L 27/14* (2006.01)
(52) U.S. Cl. ......................... 524/493; 524/545; 524/544
(58) Field of Classification Search .................. 524/493, 524/545, 544
See application file for complete search history.

(56) References Cited

U.S. PATENT DOCUMENTS

| | | | |
|---|---|---|---|
| 3,546,186 A | 12/1970 | Gladding et al. | |
| 3,852,326 A | 12/1974 | Nottke | |
| 3,933,767 A | 1/1976 | Nottke | |
| 4,138,426 A | 2/1979 | England | |
| 4,281,092 A | 7/1981 | Breazeale | |
| 5,605,973 A | 2/1997 | Yamamoto et al. | |
| 5,637,648 A | 6/1997 | Saito et al. | |
| 5,668,221 A | 9/1997 | Saito et al. | |
| 5,696,189 A | 12/1997 | Legare | |
| 6,191,208 B1 * | 2/2001 | Takahashi | 524/494 |
| 2003/0045623 A1 | 3/2003 | Higashino et al. | |
| 2005/0090598 A1 | 4/2005 | Tanaka et al. | |

FOREIGN PATENT DOCUMENTS

| | | |
|---|---|---|
| JP | 03-170319 | 7/1991 |
| JP | 06-022852 | 2/1994 |
| JP | 06-302527 | 10/1994 |
| JP | 09/031283 | 2/1997 |
| JP | 09-031284 | 2/1997 |
| JP | 2007-126568 | 5/2007 |
| JP | 2007-126568 A * | 5/2007 |
| WO | WO 97/19983 | 6/1997 |
| WO | WO00/42100 | 7/2000 |
| WO | WO 01/32782 | 5/2001 |

OTHER PUBLICATIONS

English Translation of International Preliminary Report on Patentability (Chapter I) and Written Opinion of the International Searching Authority from corresponding PCT application No. PCT/JP2007/068561, dated Apr. 30, 2009, 7 pages.

* cited by examiner

*Primary Examiner* — Robert D. Harlan
(74) *Attorney, Agent, or Firm* — Brinks Hofer Gilson & Lione

(57) ABSTRACT

A fluorine-containing elastomer composition, which comprises (A) a fluorine-containing elastomer consisting of a copolymer comprising (a) tetrafluoroethylene, (b) perfluoro (alkyl vinyl ether) or perfluoro-(alkoxyalkyl vinyl ether), and (c) a cyano group-containing perfluorovinyl ether, (B) a cross-linking agent, and (C) spherical silica, wherein the spherical silica is high purity amorphous silica particles obtained by calcining metallic silica powders, and cooling the resulting vaporous silicon oxide. The present fluorine-containing elastomer composition can provide seal materials having distinguished processability, product appearance, plasma resistance, etc. by the cyano group-containing perfluoroelastomer having a good heat resistance and only silica as contained therein.

7 Claims, No Drawings

FLUORINE-CONTAINING ELASTOMER COMPOSITION

RELATED APPLICATION

This application is a 35 U.S.C. §371 national stage filing of International Patent Application No. PCT/JP2007/068561, filed Sep. 25, 2007, to which priority is claimed under 35 U.S.C. §120 and through which and to which priority is claimed to Japanese Priority Patent Application No. 2006-271527, filed Oct. 3, 2006.

TECHNICAL FIELD

The present invention relates to a fluorine-containing elastomer composition, and more particularly to a fluorine-containing elastomer composition capable of giving a seal material having distinguished processability, product appearance, plasma resistance, etc.

BACKGROUND ART

Seals for semiconductor production apparatuses are used in processing chambers for etching the surfaces of silicon wafers, etc. as semiconductor substrates or forming thin film thereon, and thus must have a high heat resistance, a low gas permeability, low dust generation (less generation of dusts from seals), etc.

Plasma irradiation is carried out in the oxygen or $CF_4$ atmosphere during the silicon wafer etching treating, etc., and thus gases such as oxygen, halogen, or the like are brought into the excited state, so the seals for semiconductor production apparatuses are liable to deteriorate, or their surfaces become brittle, and the deteriorated, and brittled materials are scattered away to deposit on the silicon wafers. These involve serious inconveniences. Thus, the seal material for the semiconductor production apparatuses must have a plasma resistance in addition to the afore-mentioned properties, e.g. heat resistance, etc.

To meet the requirement for use at elevated temperatures such as 300° C. in the semiconductor production apparatuses, cyano group-containing perfluoroelastomers, etc. having a high heat resistance have been proposed for use. To satisfy the required plasma resistance, on the other hand, a cross-linkable fluorine-based elastomer composition, which comprises a cross-linkable fluorine-based elastomer component and fine aluminum oxide particles having an average particle size of not more than 0.5 μm, or a perfluoroelastomer composition, which comprises a reinforcing metal-containing filler and titanium dioxide substantially without any elemental carbon has been so far proposed.

Patent Document 1: WO 01/32782
Patent Document 2: JP-A-2000-502122
Patent Document 3: U.S. Pat. No. 5,696,189

Such fillers as silica, barium sulfate, alumina, aluminum silicate, etc. are effective, when added, for preventing weight reduction in the plasma-irradiated atmosphere, and ultra-size reduction of particles to less than the interlinear space distances of fine patterns formed on the semiconductor, can attain effective filling of the ultrafine particles state into the interlinear spaces of fine patterns, thereby preventing unwanted short-circuit.

In some cases, however, such elements as titanium, barium, and aluminum themselves must be forbidden to use in the semiconductor industry, and now silica is only an available material. So, a composition, which comprises 100 parts by weight of a fluorine-based elastomer, 1-50 parts by weight of silica, not more than 1 part by weight of a metal element, not more than 1 part by weight of carbon black, and 1-10 parts by weight of an organic peroxide, has been proposed.

Patent Document 4: JP2,858,198

There is a correlation between the silica particle size and the weight reduction by plasma. The smaller the particle size, the better. The afore-mentioned cyano group-containing perfluoroelastomer, when used, has a poor compatibility with a vulcanizing agent, and so involves such a inconvenience as development of deposits on the surface of product after vulcanization. That is, the cyano group-containing perfluoroelastomer, when used as a fluorine-based elastomer in the prior art of the afore-mentioned Patent Document 4, involves a difficulty in satisfying the balance between the weight reduction by plasma and the compatibility with vulcanization agent.

Silica includes wet process silica and dry process silica. The wet process silica contains moisture that can show some influences on the vulcanization rate or product foaming, and further contains more impurities such as $Na_2O$, etc. than those of the dry process silica, so it is preferable to use the dry process silica in the vulcanization, rather than the wet process silica. However, the dry process silica has a large thickening effect, resulting appearance of melt fractures on the surfaces of extrudates, with increasing hardness of the extrudates. Thus, the silica content is limited. The smaller the silica content, the less the plasma resistance. Furthermore, the single dry process silica-based products are semi-transparent, resulting in development of spotted patterns (flow marks as composition flow patterns). That is, there is such a problem as loss of uniformity in the product appearance.

DISCLOSURE OF THE INVENTION

Problem to be Solved by the Invention

The object of the present invention is to provide a fluorine-containing elastomer composition capable of producing a seal material having distinguished processability, product appearance, plasma resistance, etc. by using a cyano group-containing perfluoroelastomer as a fluorine-containing elastomer and adding only silica thereto.

Means for Solving the Problem

The object of the present invention can be attained by a fluorine-containing elastomer composition, which comprises (A) a fluorine-containing elastomer consisting of a copolymer comprising (a) tetrafluoroethylene, (b) perfluoro(alkyl vinyl ether) or perfluoro(alkoxyalkyl vinyl ether), and (c) cyano group-containing perfluorovinyl ether, (B) a cross-linking agent, and (C) spherical silica. The spherical silica is available as high purity amorphous silica particles obtained by calcining metallic silicon powders, and cooling the resulting vaporous silicon oxide.

Effect of the Invention

By using a cyano group-containing perfluoroelastomer having a distinguished heat resistance with spherical silica, the present fluorine-containing elastomer composition is used very effective for producing a seal material with a distinguished processability without melt fractures on the surface state after extrusion, and also with distinguished product appearance and plasma resistance.

BEST MODES FOR CARRYING OUT THE INVENTION

The fluorine-containing elastomer (A) for use in the present invention is a ternary copolymer of (a) tetrafluoroethylene, (b) perfluoro-(alkyl vinyl ether) or perfluoro(alkoxyalkyl vinyl ether), and (c) cyano group-containing perfluorovinyl ether, as copolymerized in a proportion of 50-74.8 mol. %, preferably 60-74.5 mol. %, of tetrafluoroethylene, 49.8-25 mol. %, preferably 39.5-25 mol. %, of perfluoro(alkyl vinyl ether) or perfluoro(alkoxyalkyl vinyl ether), and 0.2-5 mol. %, preferably 0.5-2 mol. %, of cyano group-containing perfluorovinyl ether. Other comonomers-, particularly fluorine-containing comonomers-copolymerized fluorine-containing elastomers can be used within such a range as not to hinder the object of the present invention. The fluorine-containing elastomer (A) for use herein generally has a polymer Mooney viscosity $ML_{1+10}(121°\ C.)$ of 20-150 pts, preferably 60-100 pts.

Perfluoro(alkyl vinyl ether) for use herein has an alkyl group having 1-5 carbon atoms, and includes, for example, perfluoro(methyl vinyl ether), perfluoro(ethyl vinyl ether), perfluoro(propyl vinyl ether), etc. where preferably perfluoro(methyl vinyl ether) can be used.

Perfluoro(alkoxyalkyl vinyl ether), whose vinyl ether group $CF_2=CFO-$ is bonded to a group having 3-11 carbon atoms, can be used herein, and includes, the following compounds such as:

$CF_2=CFOCF_2CF(CF_3)OC_nF_{2n+1}$ (n:1-5),

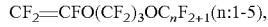

$CF_2=CFO(CF_2)_3OC_nF_{2+1}$ (n:1-5),

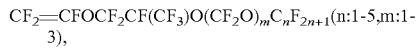

$CF_2=CFOCF_2CF(CF_3)O(CF_2O)_mC_nF_{2n+1}$ (n:1-5,m:1-3),

$CF_2=CFO(CF_2)_2OC_nF_{2n+1}$ (n:1-5), etc.

Cyano group-containing perfluorovinyl ether capable of providing a cross-linking site can be used, for example, the following compounds:

$CF_2=CFO(CF_2)_nOCF(CF_3)CN$ (n:2-4).

Compounds disclosed in the following Patent Documents can be also used:

$CF_2=CFO(CF_2)_nCN$ (n:2-12)

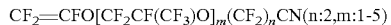

$CF_2=CFO[CF_2CF(CF_3)O]_m(CF_2)_nCN$ (n:2,m:1-5)

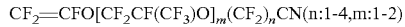

$CF_2=CFO[CF_2CF(CF_3)O]_m(CF_2)_nCN$ (n:1-4,m:1-2)

$CF_2=CFO[CF_2CF(CF_3)O]_nCF_2CF(CF)CN$ (n:0-4)

Patent Document 5: U.S. Pat. No. 3,546,186
Patent Document 6: U.S. Pat. No. 4,138,426
Patent Document 7: U.S. Pat. No. 4,281,092
Patent Document 8: U.S. Pat. No. 3,852,326
Patent Document 9: U.S. Pat. No. 3,933,767

As the cross-linking agent (B), one of compounds represented by the following general formulae [I]-[IV] can be used in a proportion of 0.1-10 parts by weight, preferably 0.5-5 parts by weight, on the basis of 100 parts by weight of fluorine-containing elastomer, where compound [II] is a bisamidoxime compound and compound [III] is a bisamidrazone compound.

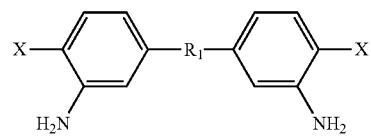

(I)

$R_1$: an alkylidene group having 1-6 carbon atoms,
 a perfluoroalkylidene group having 1-10 carbon atoms,
 $-SO_2-$ group, $-O-$group, $-C(=O)-$ group, or a carbon-carbon bond
 directly bonding two benzene rings thereto
X: a hydroxyl group or an amino group

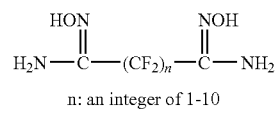

[II]

n: an integer of 1-10

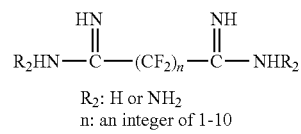

[III]

$R_2$: H or $NH_2$
n: an integer of 1-10

Preferably,

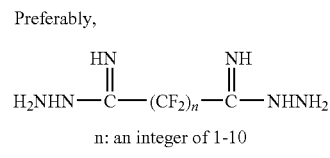

n: an integer of 1-10 n: an integer of 1-10

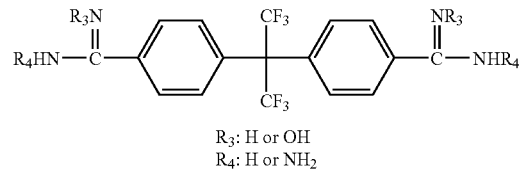

[IV]

$R_3$: H or OH
$R_4$: H or $NH_2$

Preferably,

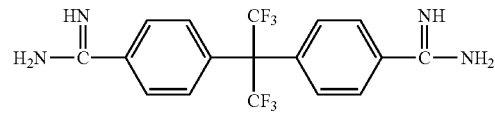

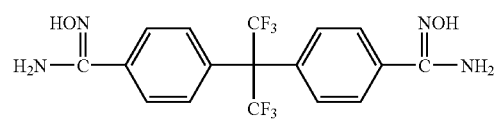

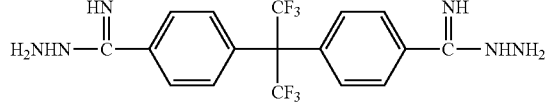

Patent Document 10: JP-A-9-31284
Patent Document 11: JP-A-9-31283

Spherical silica (C) is high purity amorphous silica particles obtained by calcining metallic silicon powders in air, and cooling the resulting vaporous silicon oxide. In the present invention spherical particles having particle sizes (as determined by a laser diffraction particle size distribution analyzer) of about 0.3 to about 2 μm, preferably about 0.4 to about 0.6 μm, can be used. In the case of spherical silica having particle sizes of less than about 0.3 μm, black particles will be formed due to the nature of the process, resulting in unpreferable product appearance, whereas in the case of spherical silica having particle sizes of more than about 2 μm, particles resulting from plasma irradiation will be so large and thus unsuitable for semiconductor use. Practically, commercially available products having within such a particle size range, for example, SO-E2, SO-E5, etc. products of Admatechs Co., can be used as such.

Patent Document 12: JP-B-7-61855
Patent Document 13: JP-B-7-102188

The spherical silica can be used in a proportion of 20-50 parts by weight, preferably 25-40 parts by weight, on the basis of 100 parts by weight of fluorine-containing elastomer. In a proportion of more than 50 parts by weight, the product after vulcanization becomes non-elastic, resulting in impermissible increase in hardness and decrease in elongation, whereas in a proportion of less than 20 parts by weight the plasma resistance will be lowered.

The composition comprising the afore-mentioned components can be prepared by mixing the components with twin roll mill at 20°-100° C., preferably 30°-80° C. Then, the composition is extrudes through an extruder at an extrusion temperature of about 60° to about 120° C., preferably about 80° to about 100° C. into a string form for a time, and then molded into a desired form such as O rings, etc. with a compression molding machine, etc. Molding is carried out at a molding temperature of 150°-250° C., preferably 170°-220° C., for a molding time of about 5 to about 60 minutes, preferably about 5 to about 30 minutes.

To improve the characteristics of molded articles, it is preferable to oven vulcanize the molded articles obtained from the present composition in an inert atmosphere at 150°-320° C., preferably 200°-300° C., for about 10 to about 50 hours. Preferably, the oven vulcanization is carried out by elevating the temperature stepwise, as shown in the following Example.

EXAMPLES

The present invention will be described in detail below, referring to Examples.

Example 1

100 parts by weight of fluorine-containing elastomer A having a polymer Mooney viscosity $ML_{1+10}$(121° C.) of 80 pts, and the following copolymer composition:

| | |
|---|---|
| Tetrafluoroethylene | 68.4 mol. % |
| Perfluoro(methyl vinyl ether) | 30.5 mol. % |
| Perfluoro(2-cyano-3,7-dioxa-8-nonene) | 1.1 mol. % | was added with the following components:

| | Parts by weight |
|---|---|
| 2,2-bis(3-amino-4-hydroxyphenyl)hexafluoropropane | 1.4 |
| Spherical silica (SO-E2; a product of Admatechs Co., particle sizes: 0.4-0.6 μm), | 30 | followed by kneading through a twin roll mill at 40°-60° C. to prepare a composition.

The resulting fluorine-containing elastomer composition was extruded through an extruder (extrusion temperature: 80° C., revolution rate: 5 rpm, and die diameter: 4.5 mm) into a string form, where the surface state of the extruded string was visually observed to make evaluation of the surface state, that is, smooth surface without generation of melt fractures was indicated as "none", whereas generation of melt fractures as "yes", in the following Table.

The resulting string form composition was compression molded at 200° C. for 15 minutes to obtain a desired molded article. The molded article was then oven vulcanized in a nitrogen atmosphere by (1) holding it at 90° C. for 4 hours, (2) elevating the temperature from 90° C. to 204° C. over 6 hours, (3) holding it at 204° C. for 18 hours, (4) elevating the temperature from 204° C. to 288° C. over 6 hours, and (5) holding it at 288° C. for 18 hours.

The resulting polymer vulcanizate was subjected to determination of normal state properties, compression set, product surface state, and percent weight reduction by plasma in a tetrafluoromethane atmosphere.

Normal state properties: according to DIN53505 (hardness) and DIN 53503 (tensile test)

Compression set: according to ASTM D395 Method B (214 O ring); 300° C. for 70 hours Product surface state: visual observation to check the presence of spotted pattern (flow marks in composition flow pattern)

Prasma test: determination of percent weight reduction (wt. %) in a $CF_4$ atmosphere with an RF generation power of 1,500 W for an irradiation time of 6 hours under vacuum of 0.1 Pa by ULVAC RBH3030 (reactive ion etching)

Example 2

In Example 1, the same amount of fluorine-containing elastomer B having a polymer Mooney viscosity $ML_{1+10}$ (121° C.) of 90 pts, and the following copolymer composition was used in place of the fluorine-containing elastomer A:

| | |
|---|---|
| Tetrafluoroethylene | 71.5 mol. % |
| Perfluoro(methyl vinyl ether) | 27.7 mol. % |
| Perfluoro(1-cyano-6-oxa-7-octene) | 0.8 mol. %, | and one part by weight of 2,2,3,3,4,4,5,5-octafluorohexanediamidoxime was additionally used as the afore-mentioned cross-linking agent [II].

Example 3

In Example 1, the amount of spherical silica was changed to 20 parts by weight.

Example 4

In Example 1, the same amount of fluorine-containing elastomer C having a polymer Mooney viscosity $ML_{1+10}$ (121° C.) of 65 pts, and the following copolymer composition was used in place of the fluorine-containing elastomer A:

| Tetrafluoroethylene | 69.0 mol. % |
|---|---|
| Perfluoro(methoxypropyl vinyl ether) | 30.0 mol. % |
| Perfluoro(2-cyano-3,7-dioxa-8-nonene) | 1.0 mol. % |

Example 5

In Example 1, the same amount of fluorine-containing elastomer B (as disclosed in Example 2) was used in place of the fluorine-containing elastomer A, and one part by weight of perfluoroadipic acid bisamidrazone was used as the afore-mentioned cross-linking agent [III] in place of 2,2-bis(3-amino-4-hydroxyphenyl)hexafluoropropane.

Example 6

In Example 1, the same amount of 2,2-bis(4-carboxyphenyl)-hexafluoropropane bisamidrazone was used as the afore-mentioned cross-linking agent [IV] in place of 2,2-bis(3-amino-4-hydroxyphenyl)-hexafluoropropane.

Comparative Example 1

In Example 1, 20 parts by weight of dry process silica (AEROSIL R972, a Degussa product; particle size: 16 nm) was used in place of the spherical silica.

Comparative Example 2

In Example 1, 20 parts by weight of dry process silica (AEROSIL 200V, a Degussa product; particle size: 12 nm) was used in place of the spherical silica.

Comparative Example 3

In Example 1, the same amount of dry process silica (AEROSIL 200V) was used in place of the spherical silica.

Results of determination and evaluation obtained in the foregoing Examples and Comparative Examples are shown in the following Table.

TABLE

| Determination • evaluation item | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Extruded surface state (Presence of melt fractures) | none | none | none | none | none | none | yes | yes | yes |
| Normal state properties | | | | | | | | | |
| Hardness (Shore-A) | 81 | 80 | 75 | 70 | 80 | 80 | 81 | 80 | 91 |
| Breaking strength (MPa) | 18.4 | 17.9 | 18.2 | 15.4 | 18.1 | 18.6 | 19.7 | 18.2 | 20.3 |
| Elongation at break (%) | 250 | 260 | 260 | 200 | 250 | 240 | 140 | 130 | 90 |
| Compression set | | | | | | | | | |
| 300° C. for 70 hours (%) | 29 | 30 | 30 | 36 | 30 | 30 | 30 | 32 | 34 |
| Product surface state | | | | | | | | | |
| Presence of spotted pattern | none | none | none | none | none | none | yes | yes | yes |
| Plasma test | | | | | | | | | |
| Weight reduction (%) | 9 | 9 | 19 | 10 | 9 | 9 | 21 | 20 | 9 |

INDUSTRIAL UTILITY

Seal materials obtained from the present fluorine-containing elastomer composition have distinguished heat resistance and plasma resistance, and thus can be effectively used as seals for semiconductor production apparatuses.

The invention claimed is:

1. A fluorine-containing elastomer composition, which comprises (A) 100 parts by weight of a fluorine-containing elastomer consisting of a copolymer comprising (a) tetrafluoroethylene, (b) perfluoro(alkyl vinyl ether) or perfluoro (alkoxyalkyl vinyl ether), and (c) a cyano group-containing perfluorovinyl ether, (B) 0.1-10 parts by weight of a cross-linking agent, and (C) 25-50 parts by weight of spherical silica.

2. A fluorine-containing elastomer composition according to claim 1, wherein the spherical silica is high purity amorphous silica particles obtained by calcining metallic silica powders, and cooling the resulting vaporous silicon oxide.

3. A fluorine-containing elastomer composition according to claim 2, wherein the high purity amorphous silica particles have particle sizes of 0.2-3 μm.

4. A fluorine-containing elastomer composition according to claim 1, wherein the cross-linking agent is anyone of compounds represented by the following general formula [I] to [IV]:

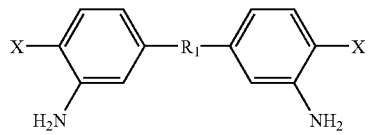

(I)

(wherein R 1 is an alkylidene group having 1-6 carbon atoms, a perfluoroalklidene group having 1-10 carbon atoms, —S02-group, —O-group, —C(=O)-group, or a carbon-carbon directly bonding two benzene rings thereto, and X is a hydroxyl group or an amino group),

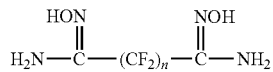

(II)

(where n is an integer of 1-10),

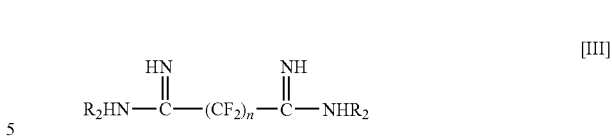

(III)

(where $R_2$ is a hydrogen atom or an amino group, and n is an integer of 1-10), and

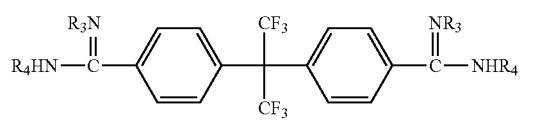

(IV)

(where $R_3$ is a hydrogen atom or a hydroxyl group and $R_4$ is a hydrogen atom or an amino group).

5. A fluorine-containing elastomer composition according to claim 1 for use as a molding material for seal materials.

6. Seal materials obtained by vulcanization molding a fluorine-containing elastomer composition according to claim 5.

7. Seal materials according to claim 6 for use as seals for semiconductor production apparatuses.

* * * * *